United States Patent
Wang et al.

(10) Patent No.: US 11,977,850 B2
(45) Date of Patent: May 7, 2024

(54) METHOD FOR DIALOGUE PROCESSING, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Fan Wang, Beijing (CN); Siqi Bao, Beijing (CN); Huang He, Beijing (CN); Hua Wu, Beijing (CN); Jingzhou He, Beijing (CN); Haifeng Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 485 days.

(21) Appl. No.: 17/411,917

(22) Filed: Aug. 25, 2021

(65) Prior Publication Data
US 2021/0383797 A1    Dec. 9, 2021

(30) Foreign Application Priority Data

Dec. 24, 2020   (CN) .......................... 202011546700.2

(51) Int. Cl.
*G06F 40/35*    (2020.01)
*G06F 16/31*    (2019.01)
(Continued)

(52) U.S. Cl.
CPC ............ *G06F 40/35* (2020.01); *G06F 16/325* (2019.01); *G06F 16/3347* (2019.01);
(Continued)

(58) Field of Classification Search
CPC .. G06F 16/325; G06F 16/3347; G06F 18/285; G06F 40/30; G06F 40/35; G10L 15/01; G10L 15/18; G10L 15/22
See application file for complete search history.

(56) References Cited

U.S. PATENT DOCUMENTS 10,740,371 B1    8/2020    Mars et al.
2006/0287865 A1   12/2006    Cross, Jr. et al.
(Continued)

FOREIGN PATENT DOCUMENTS

CN    108319599 A    7/2018
CN    108491389 A    9/2018
(Continued)

OTHER PUBLICATIONS

CN Office Action in Application No. 202011546700.2 dated Feb. 19, 2021.
(Continued)

*Primary Examiner* — Eric Yen
(74) *Attorney, Agent, or Firm* — Maschoff Brennan (57) ABSTRACT

A method for dialogue processing, an electronic device and a storage medium are provided. The specific technical solution includes: obtaining a dialogue history; selecting a target machine from a plurality of machines; inputting the dialogue history into a trained dialogue model in the target machine to generate a response to the dialogue history, in which the dialogue model comprises a common parameter and a specific parameter, and different machines correspond to the same common parameter.

20 Claims, 5 Drawing Sheets

(51) Int. Cl.
*G06F 16/33* (2019.01)
*G06F 18/20* (2023.01)
*G06F 40/30* (2020.01)
*G10L 15/01* (2013.01)
*G10L 15/18* (2013.01)
*G10L 15/22* (2006.01)

(52) U.S. Cl.
CPC ............ *G06F 18/285* (2023.01); *G06F 40/30* (2020.01); *G10L 15/01* (2013.01); *G10L 15/18* (2013.01); *G10L 15/22* (2013.01)

(56) References Cited

U.S. PATENT DOCUMENTS

| | | | |
|---|---|---|---|
| 2007/0198272 A1* | 8/2007 | Horioka | G10L 15/22 704/E15.04 |
| 2018/0181558 A1* | 6/2018 | Emery | H04L 51/02 |
| 2019/0341021 A1 | 11/2019 | Shang et al. | |
| 2020/0311616 A1* | 10/2020 | Rajkumar | G06N 3/008 |

FOREIGN PATENT DOCUMENTS

| | | |
|---|---|---|
| CN | 109977212 A | 7/2019 |
| CN | 110581772 A | 12/2019 |
| CN | 111680147 A | 9/2020 |
| JP | 2018-041124 A | 3/2018 |
| JP | 2020-053015 A | 4/2020 |
| JP | 2020-194321 A | 12/2020 |

OTHER PUBLICATIONS

CN Office Action in Application No. 202011546700.2 dated Mar. 5, 2021.
CN Office Action in Application No. 202011546700.2 dated Apr. 6, 2021.
Yuba, et al., "Emotional learning using emotion Tag, Comparative Experiment of LSTM,GRU, Technical research report of electronic information communication engineers," General incorporated electronic information communication engineers, vol. 119, Issue 317, pp. 31-36 (Nov. 21, 2019).
JP Office Action dated Nov. 15, 2022 as received in Application No. 2021-179666.

* cited by examiner

METHOD FOR DIALOGUE PROCESSING, ELECTRONIC DEVICE AND STORAGE MEDIUM

CROSS-REFERENCE TO RELATED APPLICATIONS

This application claims the benefit of priority to Chinese Application No. 202011546700.2, filed on Dec. 24, 2020, the contents of which are incorporated herein by reference in their entirety.

TECHNICAL FIELD

The present disclosure relates to a field of speech, natural language processing (NLP) and deep learning (DL) technologies, and particularly to a method for dialogue processing, an electronic device and a storage medium.

BACKGROUND

With the development of artificial intelligence (AI) and natural language processing (NLP) technologies, a dialogue processing technology is widely applied, which brings a lot of conveniences to people's life. However, the method for dialogue processing in the related art may not be concerned about both a "one to many" problem and a problem of parallel running of massive models in a dialogue system.

SUMMARY

A method for dialogue processing, an electronic device and a storage medium are provided.

According to a first aspect, a method for dialogue processing is provided and includes: obtaining a dialogue history; selecting a target machine from a plurality of machines; and inputting the dialogue history into a trained dialogue model in the target machine to generate a response to the dialogue history, in which the dialogue model comprises a common parameter and a specific parameter, and different machines correspond to the same common parameter.

According to a second aspect, an electronic device is provided, and includes: at least one processor; and a memory communicatively coupled to at least one processor; in which, the memory stores instructions executable by the at least one processor, and the instructions are executed by the at least one processor to cause the at least one processor to execute a method for dialogue processing according to the first aspect of the present disclosure.

According to a third aspect, a non-transitory computer-readable storage medium storing computer instructions is provided, in which the computer instructions are configured to cause a computer to perform a method for dialogue processing according to the first aspect.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Voice may relate to voice recognition, voice interaction and other technology fields, which is an important direction in the field of artificial intelligence.

Voice Recognition is a technology that allows a machine to convert a voice signal into a corresponding text or command through recognition and understanding process, which mainly includes a feature extraction technology, pattern matching criteria and a model training technology.

Voice Interaction is a technology that a machine and a user perform interaction, communication, information exchange and other interactive behaviors with voice as an information carrier. Compared with a traditional man-machine interaction, it is convenient and efficient, with high user comfort.

Natural Language Processing (NLP) is a science of researching a computer system, especially a software system that may effectively achieve natural language communication, which is an important direction in the field of computer science and artificial intelligence.

Deep Learning (DL) is a new research direction in the field of Machine Learning (ML), which is a science that learns inherent law and representation hierarchy of sample data to enable a machine to have analytic learning ability like humans and recognize data such as texts, images and sound, which is widely applied in voice and image recognition.

In recent years, due to application of massive dialogue corpuses and massive models, the effects of end-to-end dialogue models have made great breakthroughs. However, the current model may have 10 billion or even 100 billion parameters, which needs a storage space greater than that of a single machine. Although the problem may be alleviated by adopting a model distributed storage method, it is very complicated to update the overall structure of the model. Especially for a Graphics Processing Unit (GPU) cluster, it is quite difficult. In addition, since different sequences of dialogue may come from different backgrounds, and the backgrounds break a one-to-one correspondence between a dialogue history and a response, there may be a "one to many" problem in a dialogue system. For this purpose, a method and an apparatus for dialogue processing, an electronic device and a storage medium are provided in the present disclosure.

A method and an apparatus for dialogue processing, an electronic device and a storage medium are described referring to figures in embodiments of the present disclosure.

Figure 1:
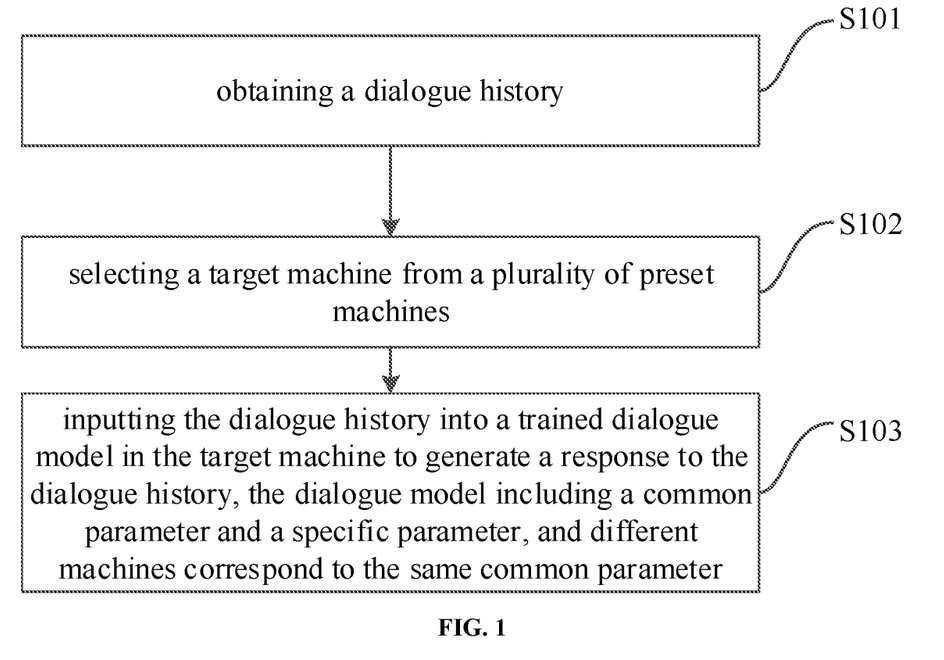
FIG. 1 is a flowchart illustrating a method for dialogue processing according to a first embodiment of the present disclosure.

FIG. 1 is a flowchart illustrating a method for dialogue processing according to a first embodiment of the present disclosure.

As illustrated in FIG. 1, the method for dialogue processing in the embodiment of the present disclosure may include the following.

At S101, a dialogue history is obtained.

Specifically, an execution subject of the method for dialogue processing in the embodiment of the present disclosure may be an apparatus for dialogue processing according to an embodiment of the present disclosure, and the apparatus for dialogue processing may be a hardware device with data information processing ability and/or a software necessary to drive the work of the hardware device. Alternatively, an execution subject may include a workstation, a server, a computer, a user terminal and other devices. The user terminal includes but is not limited to a mobile phone, a computer, a smart voice interaction device, a smart appliance, a vehicle-mounted terminal, etc.

The dialogue history $r_1, r_2, r_{t-1}$ refers to dialogue context of a current dialogue to be processed. The purpose of the method for dialogue processing in the embodiment of the present disclosure is to obtain a corresponding response $r_t$ based on the dialogue history $r_1, r_2, \ldots, r_{t-1}$.

Alternatively, the dialogue history may be obtained by recording, network transmission, etc.

For example, when the dialogue history is obtained by means of recording, a device may have an apparatus for collecting a dialogue, and the apparatus for collecting a dialogue may be a microphone, a microphone array, etc. Or, when the dialogue history is obtained by means of network transmission, a device may have an internet apparatus, and network transmission may be performed with other devices or servers through the internet apparatus.

It is understandable that, the dialogue history may be in the form of an audio, a text, etc., which will not be limited herein.

At S102, a target machine is selected from a plurality of preset machines.

Specifically, a plurality of parallel machines are preset, for example, N machines. A trained dialogue model is preset in each machine. A machine is selected from the N machines, for example, the ith machine is taken as a target machine, $i \in [1, N]$.

At S103, the dialogue history is input into a trained dialogue model in the target machine to generate a response to the dialogue history, in which the dialogue model includes a common parameter and a specific parameter, and different machines correspond to the same common parameter.

Specifically, the dialogue history obtained at block S101 is input into the trained dialogue model in the target machine selected at block S102, and the trained dialogue model outputs a response corresponding to the dialogue history.

The model parameters in the dialogue model includes a common parameter $\theta_c$ and a specific parameter $\theta_{s,i}$, the dialogue models corresponding to different machines have the same common parameter $\theta_c$ and different specific parameters $\theta_{s,i}$. As a feasible implementation method, an encoding parameter (Encoder) in the dialogue model may be taken as the common parameter $\theta c$, and a decoding parameter (Decoder) in the dialogue model may be taken as the specific parameter $\theta_{s,i}$.

It should be noted that, the dialogue model in the embodiment of the present disclosure may be any type of existing dialogue model, which is not limited herein.

Figure 2:
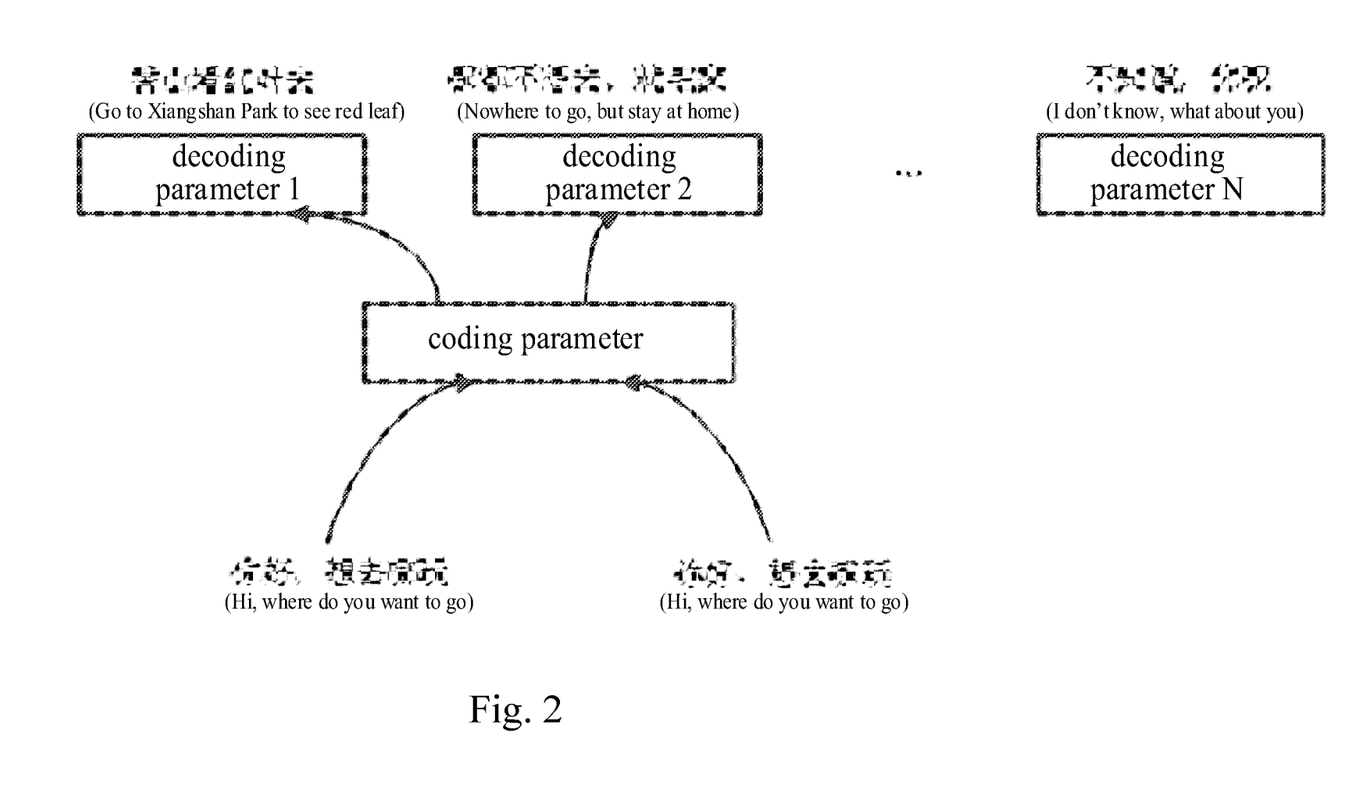
FIG. 2 is a schematic diagram illustrating an application scenario of a method for dialogue processing according to an embodiment of the present disclosure.

FIG. 2 is a schematic diagram illustrating an application scenario of a method for dialogue processing according to an embodiment of the present disclosure. As illustrated in FIG. 2, the dialogue history obtained is "你好，想去哪玩 (Hi, where do you want to go)". The dialogue history "你好，想去哪玩" is processed based on the common encoding parameter and specific decoding parameter in the trained dialogue model of the target machine i (where $i \in [1, N]$), to obtain a corresponding response. For example, when the target machine is the first machine, a response generated is "香山看红叶去 (Go to Xiangshan Park to see red leaf)", when the target machine is the second machine, a response generated is "哪都不想去，就宅家 (Nowhere to go, but stay at home)" . . . when the target machine is the Nth machine, a response generated is "不知道，你呢 (I don't know, what about you)".

In summary, in the method for dialogue processing in the embodiment of the present disclosure, a dialogue history is obtained, a target machine is selected from a plurality of preset machines, and the dialogue history is input into a trained dialogue model in the target machine to generate a response corresponding to the dialogue history, in which the dialogue model includes a common parameter and a specific parameter, and different machines correspond to the same common parameter. The method for dialogue processing in the embodiment of the present disclosure may generate a plurality of different responses according to the same dialogue history based on different target machines selected, to solve the "one to many" problem in the dialogue system. Each machine configures with one dialogue model for which only the common parameter needs to be synchronized, leading to a high parallel computing efficiency. In addition, a size of the dialogue model may be increased by increasing machines, so that a dialogue model is easy to expand its scale, such that both the "one to many" problem in the dialogue system and a problem of parallel running of massive models may be taken into consideration.

Figure 3:
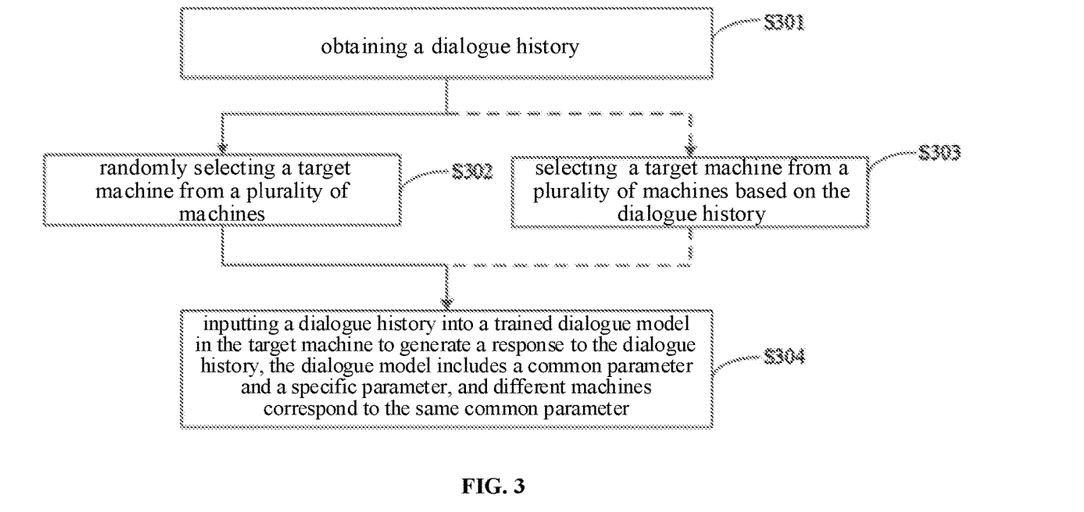
FIG. 3 is a flowchart illustrating a method for dialogue processing according to a second embodiment of the present disclosure.

FIG. 3 is a flowchart illustrating a method for dialogue processing according to a second embodiment of the present disclosure.

As illustrated in FIG. 3, the method for dialogue processing in the embodiment of the present disclosure may include the following.

At S301, a dialogue history is obtained.

Specifically, the block S301 is the same with the block S101 in the above embodiment, which will not be repeated here.

The block S102 in the above embodiment may include the following block S302 or S303.

At S302, a target machine is randomly selected from a plurality of machines.

Specifically, a machine is randomly selected from N preset machines, for example, the ith machine is selected as the target machine, $i \in [1, N]$.

At S303, a target machine is selected from a plurality of machines based on the dialogue history.

Specifically, according to a dialogue history $r_1, r_2, r_{t-1}$, a preset distribution function $i=f(r_1, \ldots, r_1) \in [1, N]$ may be adopted to determine the ith machine as the target machine.

At S304, the dialogue history is input into a trained dialogue model in the target machine to generate a response to the dialogue history, in which the dialogue model includes a common parameter and a specific parameter, and different machines correspond to the same common parameter.

Specifically, the block S304 is the same with the block S103 in the above embodiment, which will not be repeated here.

As a feasible implementation, the above block S303 "selecting the target machine from the plurality of machines based on the dialogue history" may specifically include: generating a dialogue vector based on the dialogue history; mapping the dialogue vector to the target machine by a hash function.

As a feasible implementation, the above block S303 "selecting the target machine from the plurality of machines based on the dialogue history" may specifically include: generating a dialogue vector based on the dialogue history; determining a category based on the dialogue vector; determining the target machine based on the category.

Figure 4:
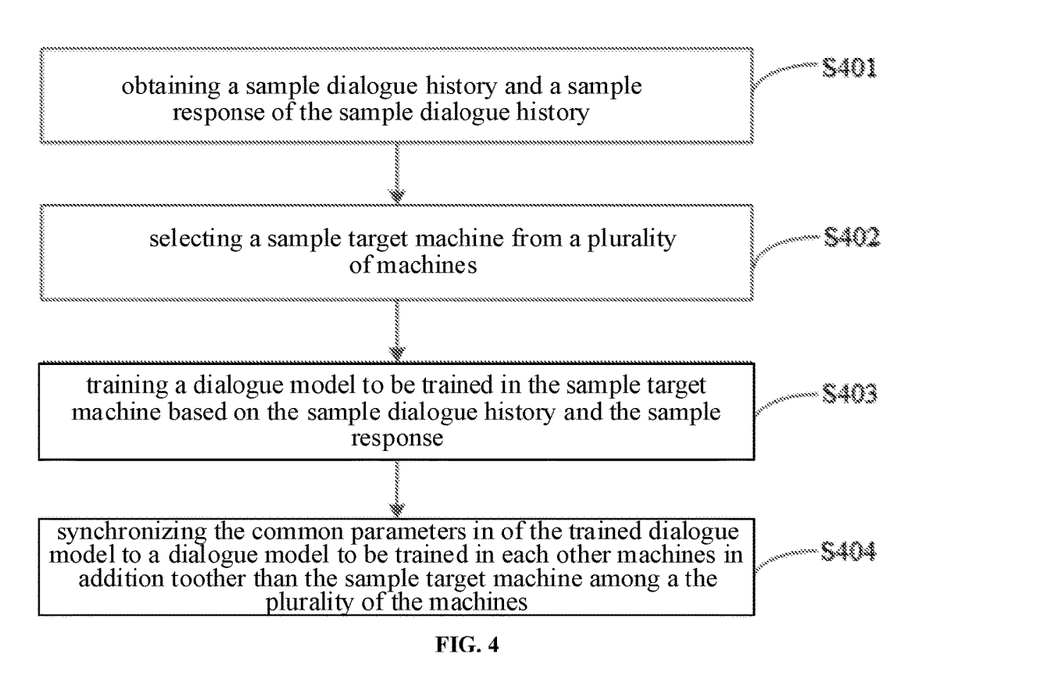
FIG. 4 is a flowchart illustrating a method for dialogue processing according to a third embodiment of the present disclosure.

Further, as illustrated in FIG. 4, the method for dialogue processing in the embodiment of the present disclosure may further include the following steps for training a dialogue model.

At S401, a sample dialogue history and a sample response are obtained.

Specifically, the sample dialogue history refers to dialogue context of the history dialogue, and the sample response is a response corresponding to the dialogue context of the history dialogue.

At S402, a sample target machine is selected from the plurality of machines.

Specifically, the block S402 is similar to the block S102 in the above embodiment, which will not be repeated here.

At S403, a dialogue model to be trained in the sample target machine is trained based on the sample dialogue history and the sample response.

Specifically, the sample dialogue history obtained at S401 is taken as an input of the dialogue model to be trained in the sample target machine selected at S402, and the sample response obtained at S401 is taken as an output of the dialogue model to be trained, to train the dialogue model to be trained, that is, to update the common parameter and the specific parameter in the dialogue model to be trained.

At S404, the common parameter in the trained dialogue model is synchronized to a dialogue model to be trained in each machine other than the sample target machine among the plurality of the machines.

Specifically, the common parameter in the trained dialogue model obtained at S403 is synchronized to other machines in addition to the sample target machine among the N machines, and then model training may be continued based on a next sample dialogue history and a corresponding sample response till a training end condition is met, such that the trained dialogue model is obtained.

Further, the above block S402 "selecting the sample target machine from the plurality of machines" may specifically include: randomly selecting the sample target machine from the plurality of machines; or selecting the sample target machine from the plurality of machines based on the sample dialogue history and the sample response.

As a feasible implementation, the above step "selecting the sample target machine from the plurality of machines based on sample dialogue history and the sample response" may specifically include: generating a sample dialogue vector based on the sample dialogue history and the sample response; mapping the sample dialogue vector to the sample target machine by a hash function.

As a feasible implementation, the above step "selecting the sample target machine from the plurality of machines based on the sample dialogue history and the sample response" may specifically include: generating a sample dialogue vector based on the sample dialogue history and the sample response; determining a sample category based on the sample dialogue vector; determining the sample target machine based on the sample category.

In summary, in the method for dialogue processing in the embodiment of the present disclosure, a dialogue history is obtained, a target machine is selected from a plurality of preset machines, and the dialogue history is input into a trained dialogue model in the target machine to generate a response corresponding to the dialogue history, in which the dialogue model includes a common parameter and a specific parameter, and different machines correspond to the same common parameter. The method for dialogue processing in the embodiment of the present disclosure may generate different responses according to the same dialogue history based on different target machines selected, to solve the "one to many" problem in the dialogue system. Each machine configures with one dialogue model for which only the common parameter needs to be synchronized, leading to a high parallel computing efficiency. In addition, a size of the dialogue model may be increased by increasing machines, so that a dialogue model is easy to expand its scale, and both the "one to many" problem in the dialogue system and a problem of parallel running of massive model are taken into consideration.

Figure 5:
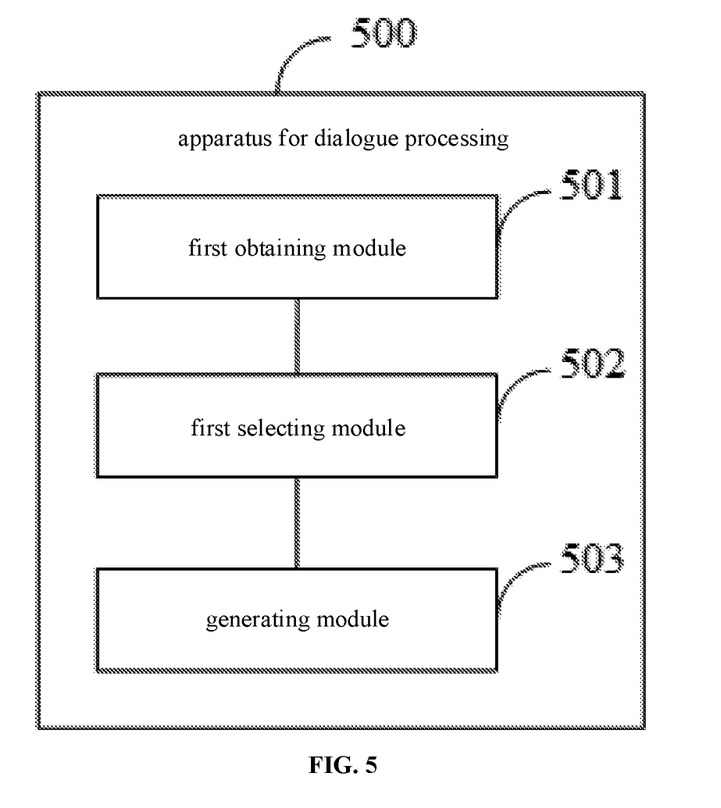
FIG. 5 is a block diagram illustrating an apparatus for dialogue processing according to a first embodiment of the present disclosure.

FIG. 5 is a block diagram illustrating an apparatus for dialogue processing according to a first embodiment of the present disclosure.

As illustrated in FIG. 5, the apparatus 500 for dialogue processing in the embodiment of the present disclosure includes a first obtaining module 501, a first selecting module 502 and a generating module 503.

The first obtaining module 501 is configured to obtain a dialogue history.

The first selecting module 502 is configured to select a target machine from a plurality of machines.

The generating module 503 is configured to input a dialogue history into a trained dialogue model in the target machine to generate a response to the dialogue history, in which the dialogue model includes a common parameter and a specific parameter, and different machines correspond to the same common parameter.

It should be noted that the foregoing explanation of the embodiment of the method for dialogue processing is also applied to the apparatus for dialogue processing in the embodiment, which will not be repeated here.

In summary, in the apparatus for dialogue processing in the embodiment of the present disclosure, a dialogue history is obtained, a target machine is selected from a plurality of preset machines, and the dialogue history is input into a trained dialogue model in the target machine to generate a response corresponding to the dialogue history, in which the dialogue model includes a common parameter and a specific parameter, and different machines correspond to the same common parameter. The method for dialogue processing in the embodiment of the present disclosure may generate different responses according to the same dialogue history based on different target machines selected, to solve the "one to many" problem in the dialogue system. Each machine configures with one dialogue model for which only the common parameter needs to be synchronized, leading to a high parallel computing efficiency. In addition, a size of the dialogue model may be increased by increasing machines, so that a dialogue model is easy to expand its scale, such that both the "one to many" problem in the dialogue system and a problem of parallel running of massive models may be taken into consideration.

Figure 6:
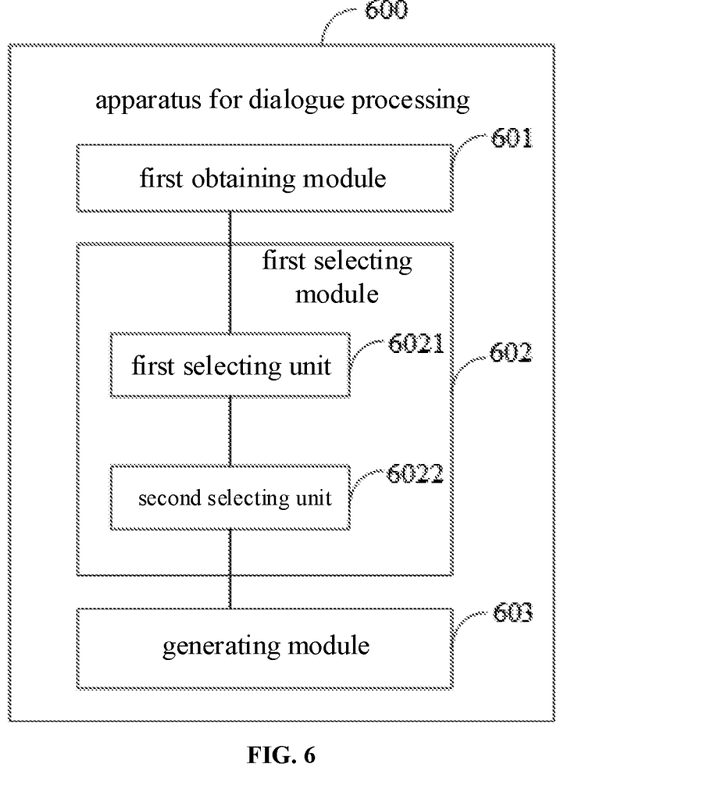
FIG. 6 is a block diagram illustrating an apparatus for dialogue processing according to a second embodiment of the present disclosure.

FIG. 6 is a block diagram illustrating an apparatus for dialogue processing according to a second embodiment of the present disclosure.

As illustrated in FIG. 6, the apparatus 600 for dialogue processing in the embodiment of the present disclosure includes a first obtaining module 601, a first selecting module 602 and a generating module 603.

The first obtaining module 601 has the same function and structure as the first obtaining module 501 in the above embodiment, and the generating module 603 has the same function and structure as the generating module 503 in the above embodiment.

The first selecting module 602 may include a first selecting unit 6021, configured to randomly select the target machine from the plurality of machines, or, a second selecting unit 6022, configured to select the target machine from the plurality of machines based on the dialogue history.

As a feasible implementation, the second selecting unit 6022 may include: a first generating subunit, configured to generate a dialogue vector based on a dialogue history; a first mapping subunit, configured to map the dialogue vector to a target machine by a hash function.

As another feasible implementation, the second selecting unit 6022 may include: a second generating subunit, configured to generate a dialogue vector based on a dialogue history; a first determining subunit, configured to determine a category based on a dialogue vector; a second determining subunit, configured to determine a target machine based on the category.

Further, the apparatus 600 for dialogue processing in the embodiment of the present disclosure may further include: a second obtaining module, configured to obtain a sample dialogue history and a sample response of the sample dialogue history; a second selecting module, configured to select a sample target machine in the plurality of machines; a training module, configured to train a dialogue model to be trained in the sample target machine based on the sample dialogue history and the sample response; a synchronizing module, configured to synchronize the common parameter of the trained dialogue model to a dialogue model to be trained in each machine other than the sample target machine among the plurality of machines.

Further, the second selecting module may include: a third selecting unit, configured to randomly select a sample target machine from the plurality of machines; or a fourth selecting unit, configured to select a sample target machine from the plurality of machines based on the sample dialogue history and the sample response.

As a feasible implementation, the fourth selecting unit may specifically include: a third generating subunit, configured to generate a sample dialogue vector based on a sample dialogue history and a sample response; a second mapping subunit, configured to map the sample dialogue vector to a sample target machine by a hash function.

As another feasible implementation, the fourth selecting unit may include: a fourth generating subunit, configured to generate a sample dialogue vector based on a sample dialogue history and a sample response; a third determining subunit, configured to determine a sample category based on a sample dialogue vector; a fourth determining subunit, configured to determine a sample target machine based on the sample category.

It should be noted that the foregoing explanation of the embodiment of the method for dialogue processing is also applied to the apparatus for dialogue processing in the embodiment, which will not be repeated here.

In summary, in the apparatus for dialogue processing in the embodiment of the present disclosure, a dialogue history is obtained, a target machine is selected from a plurality of preset machines, and the dialogue history is input into a trained dialogue model in the target machine to generate a response corresponding to the dialogue history, in which the dialogue model includes a common parameter and a specific parameter, and different machines correspond to the same common parameter. The method for dialogue processing in the embodiment of the present disclosure may generate different responses according to the same dialogue history based on different target machines selected, to solve the "one to many" problem in the dialogue system. Each machine configures with one dialogue model for which only the common parameter needs to be synchronized, leading to a high parallel computing efficiency. In addition, a size of the dialogue model may be increased by increasing machines, so that a dialogue model is easy to expand its scale, such that both the "one to many" problem in the dialogue system and a problem of parallel running of massive models may be taken into consideration.

According to one embodiment of the present disclosure, an electronic device and a readable storage medium are further provided in the embodiment.

Figure 7:
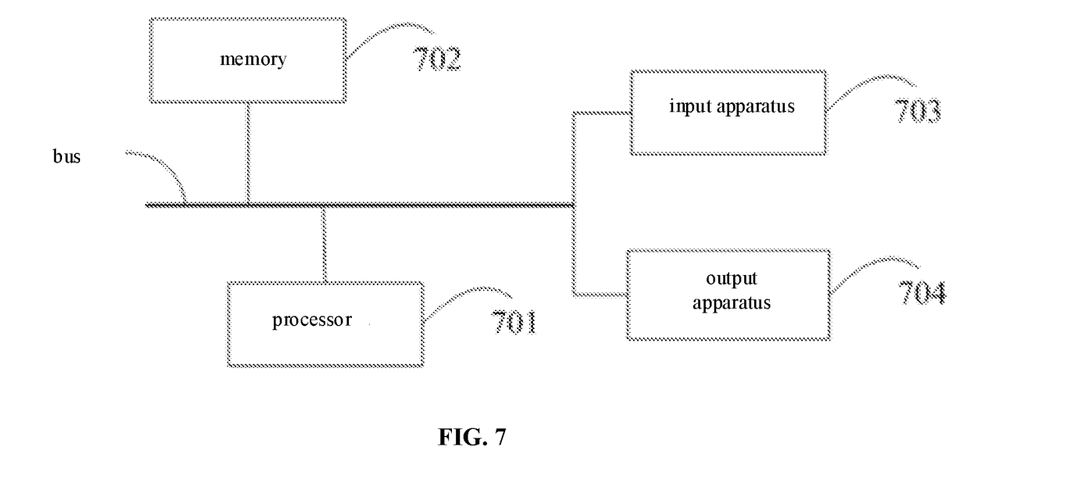
FIG. 7 is a block diagram illustrating an electronic device configured to implement a method for dialogue processing in embodiments of the present disclosure.

FIG. 7 is a block diagram illustrating an electronic device configured to implement a method for dialogue processing in the embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as intelligent speech interaction devices, personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 7, the electronic device includes: one or more processors 701, a memory 702, and an interface configured to connect various components, including a high-speed interface and a low-speed interface. The various components are connected to each other with different buses, and may be installed on a public main board or installed in other ways as needed. The processor 701 may process instructions executed in the electronic device, including instructions stored in or on the memory to display graphical information of the GUI on an external input/output device (such as a display device coupled to an interface). In other implementation, a plurality of processors and/or a plurality of buses may be configured with a plurality of memories if necessary. Similarly, the processor may connect a plurality of electronic devices, and each device provides a part of necessary operations (for example, as a server array, a group of blade servers, or a multi-processor system). FIG. 7 takes one processor 701 as an example.

The memory 702 is a non-transitory computer-readable storage medium provided in the present disclosure. The memory stores instructions executable by the at least one processor, so that the at least one processor executes a method for dialogue processing as described in the present disclosure. The non-transitory computer-readable storage medium of the present disclosure stores computer instructions, in which the computer instructions are configured so that a method for dialogue processing provided in the present disclosure.

As a non-transitory computer-readable storage medium, the memory 702 may be configured to store non-transitory software programs, non-transitory computer-executable programs and modules, such as program instructions/modules corresponding to a method for dialogue processing in the embodiment of the present disclosure (for example, a first obtaining module 501, a first selecting module 502 and a generating module 503 as illustrated in FIG. 5). The processor 701 executes various functional applications and data processing of the server by running a non-transitory software program, an instruction, and a module stored in the memory 702, that is, a method for dialogue processing in the above method embodiment is implemented.

The memory 702 may include a program storage area and a data storage area; the program storage area may store operation systems and application programs required by at least one function; the data storage area may store data created based on the use of an electronic device according to the method for dialogue processing, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 optionally includes a memory set remotely relative to the processor 701 that may be connected to an electronic device executing a method for dialogue processing via a network. The example of the above networks includes but not limited to an Internet, an enterprise intranet, a local area network, a mobile communication network and their combination.

An electronic device in a method for dialogue processing may further include an input apparatus 703 and an output apparatus 704. The processor 701, the memory 702, the input apparatus 703, and the output apparatus 704 may be connected through a bus or in other ways. FIG. 7 takes connection through a bus as an example.

The input apparatus 703 may receive input digital or character information, and generate key signal input related to user setting and function control of an electronic device executing a method for dialogue processing, such as a touch screen, a keypad, a mouse, a track pad, a touch pad, an indicating rod, one or more mouse buttons, a trackball, a joystick and other input apparatuses. The output apparatus 704 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

According to an embodiment, a computer program product including a computer program is further provided in the present disclosure, in which the computer program is configured to execute a method for dialogue processing as described in the above embodiment when executed by a processor.

In summary, according to the technical solution in the embodiments of the present disclosure, a dialogue history is obtained, a target machine is selected from a plurality of preset machines, and the dialogue history is input into a trained dialogue model in the target machine to generate a response corresponding to the dialogue history, in which the dialogue model includes a common parameter and a specific parameter, and different machines correspond to the same common parameter. The method for dialogue processing in the embodiment of the present disclosure may generate different responses according to the same dialogue history based on different target machines selected, to solve the "one to many" problem in the dialogue system. Each machine configures with one dialogue model for which only the common parameter needs to be synchronized, leading to a high parallel computing efficiency. In addition, a size of the dialogue model may be increased by increasing machines, so that a dialogue model is easy to expand its scale, such that both the "one to many" problem in the dialogue system and a problem of parallel running of massive models may be taken into consideration.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for dialogue processing, comprising:
obtaining a dialogue history;
selecting a target machine from a plurality of machines; and
inputting the dialogue history into a trained dialogue model in the target machine to generate a response to the dialogue history, wherein the trained dialogue model comprises a common parameter and a specific parameter, and different machines correspond to the same common parameter.

2. The method of claim 1, wherein, selecting the target machine from the plurality of machines comprises one of the following operations:
randomly selecting the target machine from the plurality of machines;
selecting the target machine from the plurality of machines based on the dialogue history.

3. The method of claim 2, wherein, selecting the target machine from the plurality of machines based on the dialogue history comprises:
generating a dialogue vector based on the dialogue history; and
mapping the dialogue vector to the target machine by a hash function.

4. The method of claim 2, wherein, selecting the target machine from the plurality of machines based on the dialogue history comprises:
generating a dialogue vector based on the dialogue history;
determining a category based on the dialogue vector; and
determining the target machine based on the category.

5. The method of claim 1, further comprising:
obtaining a sample dialogue history and a sample response of the sample dialogue history;
selecting a sample target machine from the plurality of machines;
training a dialogue model to be trained in the sample target machine based on the sample dialogue history and the sample response; and
synchronizing the common parameter of the trained dialogue model to a dialogue model to be trained in each machine other than the sample target machine among the plurality of machines.

6. The method of claim 5, wherein, selecting the sample target machine from the plurality of machines comprises one of the following operations:
randomly selecting the sample target machine from the plurality of machines;
selecting the sample target machine from the plurality of machines based on the sample dialogue history and the sample response.

7. The method of claim 6, wherein, selecting the sample target machine from the plurality of machines based on the sample dialogue history and the sample response comprises:
generating a sample dialogue vector based on the sample dialogue history and the sample response; and
mapping the sample dialogue vector to the sample target machine by a hash function.

8. The method of claim 6, wherein, selecting the sample target machine from the plurality of machines based on the sample dialogue history and the sample response comprises:
generating a sample dialogue vector based on the sample dialogue history and the sample response;
determining a sample category based on the sample dialogue vector; and
determining the sample target machine based on the sample category.

9. An electronic device, comprising:
at least one processor; and
a memory communicatively coupled to the at least one processor;
wherein, the memory stores instructions executable by the at least one processor, wherein the instructions are executed by the at least one processor to cause the at least one processor to perform a method for dialogue processing comprising:
obtaining a dialogue history;
selecting a target machine from a plurality of machines; and
inputting the dialogue history into a trained dialogue model in the target machine to generate a response to the dialogue history, wherein the trained dialogue model comprises a common parameter and a specific parameter, and different machines correspond to the same common parameter.

10. The device of claim 9, wherein, selecting the target machine from the plurality of machines comprises one of the following operations:
   randomly selecting the target machine from the plurality of machines;
   selecting the target machine from the plurality of machines based on the dialogue history.

11. The device of claim 10, wherein, selecting the target machine from the plurality of machines based on the dialogue history comprises:
   generating a dialogue vector based on the dialogue history; and
   mapping the dialogue vector to the target machine by a hash function.

12. The device of claim 10, wherein, selecting the target machine from the plurality of machines based on the dialogue history comprises:
   generating a dialogue vector based on the dialogue history;
   determining a category based on the dialogue vector; and
   determining the target machine based on the category.

13. The device of claim 9, wherein the at least one processor to is further caused to perform:
   obtaining a sample dialogue history and a sample response of the sample dialogue history;
   selecting a sample target machine from the plurality of machines;
   training a dialogue model to be trained in the sample target machine based on the sample dialogue history and the sample response; and
   synchronizing the common parameter of the trained dialogue model to a dialogue model to be trained in each machine other than the sample target machine among the plurality of machines.

14. The device of claim 13, wherein, selecting the sample target machine from the plurality of machines comprises one of the following operations:
   randomly selecting the sample target machine from the plurality of machines;
   selecting the sample target machine from the plurality of machines based on the sample dialogue history and the sample response.

15. The device of claim 14, wherein, selecting the sample target machine from the plurality of machines based on the sample dialogue history and the sample response comprises:
   generating a sample dialogue vector based on the sample dialogue history and the sample response; and
   mapping the sample dialogue vector to the sample target machine by a hash function.

16. The device of claim 14, wherein, selecting the sample target machine from the plurality of machines based on the sample dialogue history and the sample response comprises:
   generating a sample dialogue vector based on the sample dialogue history and the sample response;
   determining a sample category based on the sample dialogue vector; and
   determining the sample target machine based on the sample category.

17. A non-transitory computer-readable storage medium storing computer instructions, wherein the computer instructions are configured to cause a computer to perform a method for dialogue processing comprising:
   obtaining a dialogue history;
   selecting a target machine from a plurality of machines; and
   inputting the dialogue history into a trained dialogue model in the target machine to generate a response to the dialogue history, wherein the trained dialogue model comprises a common parameter and a specific parameter, and different machines correspond to the same common parameter.

18. The storage medium of claim 17, wherein, selecting the target machine from the plurality of machines comprises one of the following operations:
   randomly selecting the target machine from the plurality of machines;
   selecting the target machine from the plurality of machines based on the dialogue history.

19. The storage medium of claim 18, wherein, selecting the target machine from the plurality of machines based on the dialogue history comprises:
   generating a dialogue vector based on the dialogue history; and
   mapping the dialogue vector to the target machine by a hash function.

20. The storage medium of claim 18, wherein, selecting the target machine from the plurality of machines based on the dialogue history comprises:
   generating a dialogue vector based on the dialogue history;
   determining a category based on the dialogue vector; and
   determining the target machine based on the category.

* * * * *